2 Sheets—Sheet 1.

E. LANGEN.

Sugar-Liquoring Apparatus.

No. 8,620. Reissued Mar. 11, 1879.

Witnesses:
Edw. A. Parsons
Geo. H. Mott

Inventor:
Eugen Langen
Per Edw. E. Leimy
Atty.

N. PETERS, PHOTO-LITHOGRAPHER, WASHINGTON, D. C.

E. LANGEN.

Sugar-Liquoring Apparatus.

No. 8,620. Reissued Mar. 11, 1879.

Witnesses:
Edw^d Payson
Geo. H. Miatt

Inventor:
Eugen Langen
Per Edw. E. Lumby
Atty.

N. PETERS, PHOTO-LITHOGRAPHER, WASHINGTON, D. C.

UNITED STATES PATENT OFFICE.

EUGEN LANGEN, OF COLOGNE, PRUSSIA.

IMPROVEMENT IN SUGAR-LIQUORING APPARATUS.

Specification forming part of Letters Patent No. 151,603, dated June 2, 1874; Reissue No. 8,620, dated March 11, 1879; application filed October 12, 1878.

*To all whom it may concern:*

Be it known that I, EUGEN LANGEN, of Cologne, Prussia, have invented certain Improvements in Sugar-Liquoring Apparatus, of which the following is a specification:

My improved apparatus is designed for use in the manufacture of hard sugar; and it consists of devices by means of which the cooled and crystallized sugar mass contained in the molds into which it has been run from the vacuum-pan is impregnated with the white or claying liquor from below, the white or claying liquor, which is usually a saturated solution of sugar, being forced upward through the sugar mass by hydrostatic, hydraulic, or other pressure, driving before it any air contained in the molds or in the crystallized sugar-mass, and also eliminating and driving upward any green sirup contained in the sugar-mass.

My devices for accomplishing this object consist of a table provided with a series of rectangular seats for engaging the edges of the sugar-mold frames and centralizing each frame over the mouth of a vertical branch pipe connected with the service-pipe through which the claying-liquor is supplied.

Figure 1:
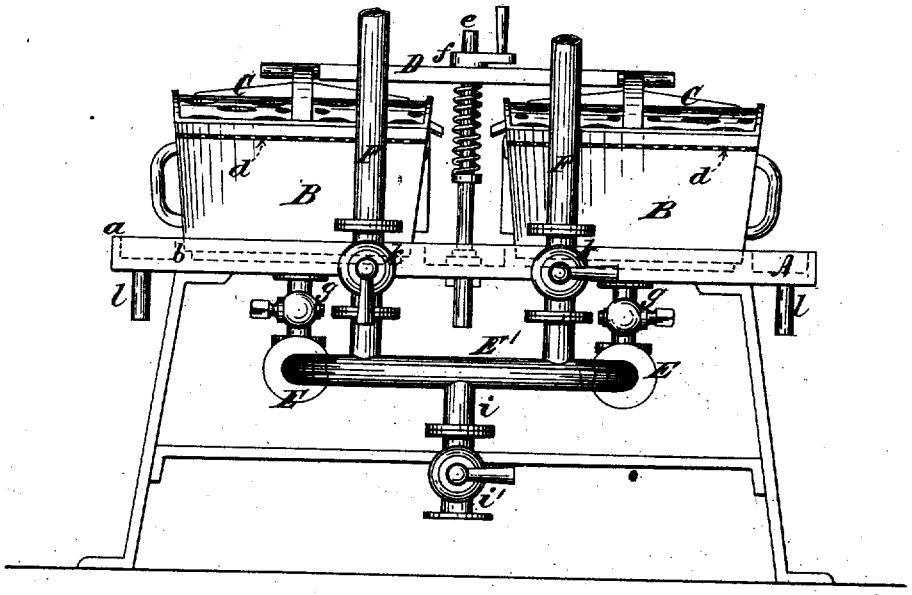
Figure 2:
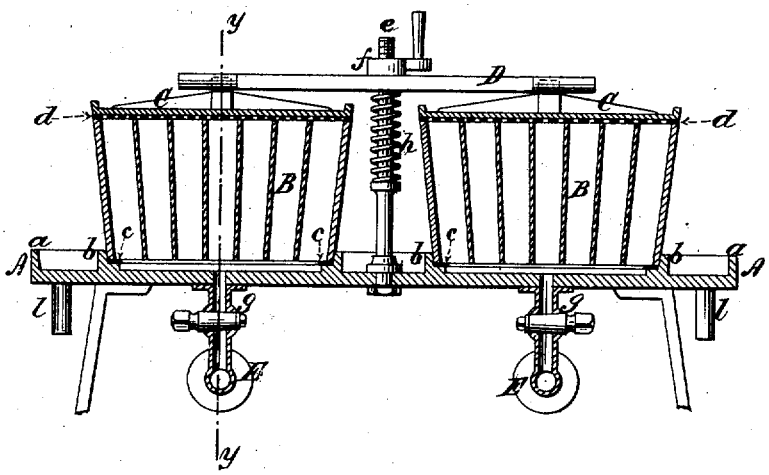
Figure 3:
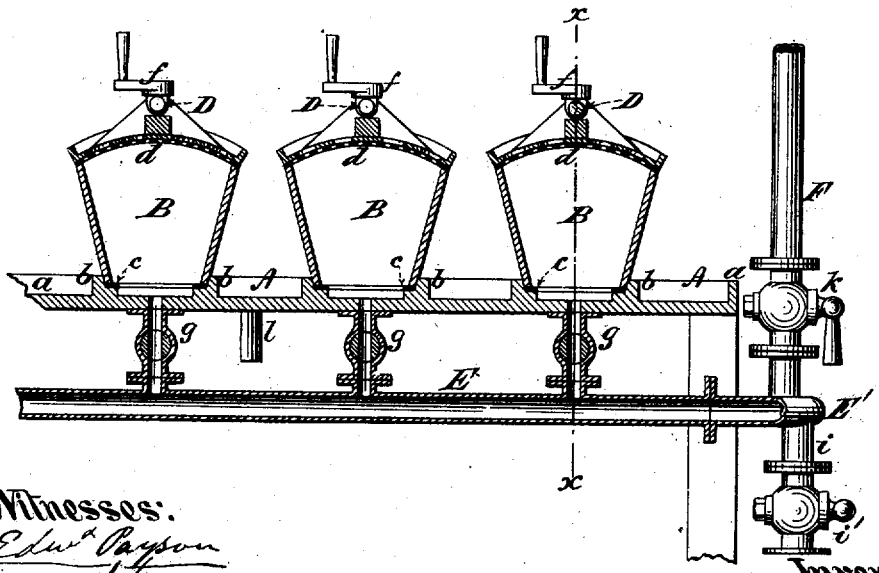

The accompanying drawings are as follows: Figure 1 is an end elevation of my improved sugar-liquoring apparatus; Fig. 2, a transverse vertical section of the same through the line *x x* on Fig. 3, which is a longitudinal sectional elevation through the line *y y* on Fig. 2.

Referring to the drawings, the apparatus consists of a suitable table, A, on the top of which are several series of seats or recesses *b*, arranged in parallel rows, for engaging the open ends of the molds B, in which the sugar mass to be cleansed is contained. An india-rubber or other suitable gasket, *c*, is placed around the edge of each of the recesses *b*, to receive the impact of the bottom of the mold and make a tight joint therewith when the mold is clamped down upon its seat. The upper open faces of the molds are provided with perforated covers C, lined with wire-gauze or other perforated packing *d*, the perforations in the covers serving to provide for the escape of air and sirup from the sugar mass when expelled therefrom in the cleansing process. The upper side of each cover is furnished with a knob for convenience in handling.

The molds are clamped down upon their seats by means of the clamping-bars D, which engage the knobs on the covers of the molds. The clamping-bars are centered loosely on the vertical screw-bolts *e*, and are pressed upward by the spiral springs *h* against the lower face of the crank-nuts *f*. The opposite ends of each clamping-bar engage notches in the knobs on the covers C, and by screwing down each crank-nut *f* the opposite ends of the respective clamping-bars D compress two adjoining molds firmly upon their seats, as shown in Figs. 1 and 2. When it is desired to remove the molds the crank-nuts *f* are unscrewed, the spiral springs *h* throw the clamping-bars up, and the molds can then be lifted from their seats. Beneath each row of seats is a service-pipe, E, with which each recess is connected by the branch pipes *g*, provided with regulating cocks. The service-pipes E are supplied with the cleansing-liquor under pressure—as, for instance, by pumps or hydrostatic pressure—through one or more supply-pipes, F F, provided with the stop-cocks K K.

In operation, the cleansing-liquor delivered through the supply-pipes F F is forced through the service-pipes E E and the branches *g* upward into the recesses in the table and through the sugar mass contained in the molds. In this upward motion through the sugar mass, the cleansing-liquor displaces any air therein, and forces the green sirup in the sugar upward and outward through the perforations in the covers of the molds. The completion of the operation is indicated by the exhibition of the cleansing-liquor at the top of the molds. As soon as the cleansing-liquor begins to flow freely through the perforations in the covers of the molds the cleansing operation is arrested by shutting off the further supply of cleansing-liquor, and thus any waste of the cleansing-liquor is avoided. The liquor which overflows from the molds through the perforations in their covers falls upon the table, which is provided around its outer edge with the vertical flange *a*. The top of the table is therefore a drip-pan, and it is drained through the drip-pipes *l* into any suitable vessel placed underneath the table for the purpose of receiving the drip therefrom.

It will be seen that the two service-pipes E E are connected at the end of the apparatus by the return-bend pipe E′, from the center of which depends the drain-pipe *i*, provided with the stop-cock *i′*. It will also be seen that when the cocks K in the supply-pipes F F are closed, and the branch cocks *g* and the drain-cock *i′* are open, the recesses *b* can be drained of any fluid which they may contain. After the cleansing operation is completed the molds are removed and placed in the centrifugal machine for the purpose of purging the sugar by driving out the cleansing-liquor or any green sirup which may remain in the sugar masses in the molds.

Of course the shape of the table A may be modified in various ways. For example, it may be round, and the recessed seats may be arranged concentrically, so that a single center vertical bolt provided with a crank-nut may operate a single clamping bar or frame, and simultaneously compress all the molds upon their seats. If desired, an annular table may be placed around the centrifugal machine, or a separate table may be used for each mold. In all such modifications, however, the liquoring process will be the same. The opposite open-faced molds, which are made tapering for arrangement within the centrifugal machine, will be placed upon the table with their smaller open faces downward, so that the cleansing-liquor will enter through the smaller faces of the molds and pass upward through the sugar mass, and thus displace the air therefrom, and force the green sirup upward and out of the larger open faces of the molds, which faces, in the subsequent operation of purging, will be nearest to the basket of the centrifugal machine. Thus any sirup remaining in the sugar mass will be at the widest part of the mold, and will be thrown directly out by the centrifugal action of the machine without being forced through the entire mass of sugar contained in the molds.

If the sugar masses in the molds are not fully cleansed by one operation, the molds may be removed from the centrifugal machine and replaced upon the liquoring-table, and the cleansing operation be repeated until perfectly-white sugar is obtained.

I claim as my invention—

1. A liquoring-table provided with a seat for engaging and centralizing a sugar-mold frame in prescribed position, in combination with said mold frame and with a pipe for discharging a fluid upward, into, and through the mass contained in the mold-frame, substantially as described.

2. In a liquoring-table provided with a series of seats for engaging a series of sugar-mold frames and a service-pipe with branches for discharging the treating-fluid upward through each one of the mold-frames, the stop-cocks *g*, whereby the treating-fluid may be shut off from one or more of the mold-frames.

3. A liquoring-table provided with pipes or conduits for the supply of the treating-fluid, in combination with the sugar-mold frame, the perforated cover *c*, and the clamping-bar D, for the purpose of holding the mold firmly and tightly upon its seat.

EUGEN LANGEN.

Witnesses:
HERMANN POHLMANN,
JACOB EICK.